(No Model.)
H. W. MORGAN.
CASKET HANDLE.
No. 245,543. Patented Aug. 9, 1881.
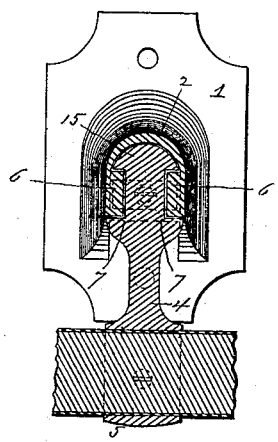
Fig. II
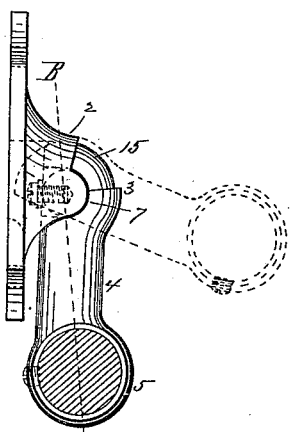
Fig. I
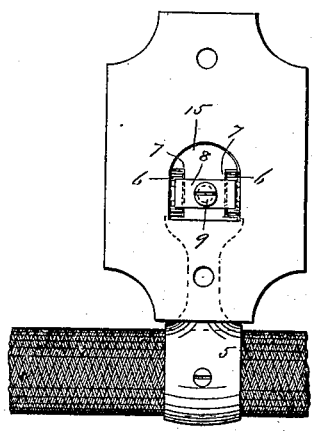
Fig. III
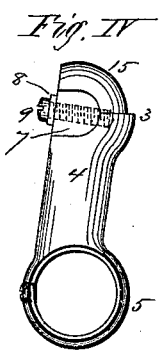
Fig. IV
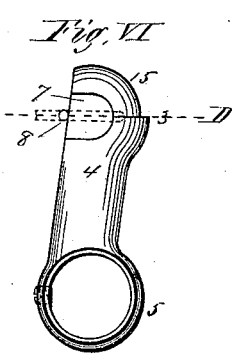
Fig. VI
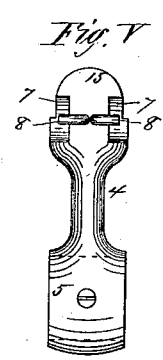
Fig. V
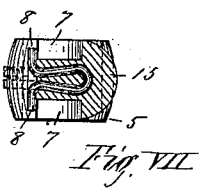
Fig. VII
Witnesses—
C. H. Wood.
W. D. Taylor.
Inventor.
Hubert W. Morgan
By T. A. Curtis,
his Atty.

United States Patent Office.

HUBERT W. MORGAN, OF WESTFIELD, MASSACHUSETTS.

CASKET-HANDLE.

SPECIFICATION forming part of Letters Patent No. 245,543, dated August 9, 1881.

Application filed June 9, 1881. (No model.)

*To all whom it may concern:*

Be it known that I, HUBERT W. MORGAN, of Westfield, in the county of Hampden and State of Massachusetts, have invented a new and useful Improvement in Casket-Handles, of which the following is a specification and description.

The object of my invention is to provide an effective and economical joint for securing the arm to which a casket-handle is secured to the socket which is attached to the casket; and I accomplish this by the means substantially as hereinafter described, and illustrated in the accompanying drawings, in which—

Figure I is a side view of the flanged socket and arm jointed together according to my invention. Fig. II is a longitudinal vertical section through the arm and the joint which secures the arm to the socket. Fig. III is a rear view of the socket and the arm jointed thereto. Fig. IV is a side view of the arm, with one modification of friction-lock. Fig. V is a rear view of the arm, with another modification of friction-lock. Fig. VI is a side view of the same; and Fig. VII is a horizontal section of the same at line D, showing the wire friction-lock as cast into the metal arm.

In the drawings, 2 represents the socket, which is flanged and secured to the casket by screws, the opening of which socket is semicircular or arched at the upper part, and in each side of which is an inwardly-projecting trunnion, as 6. The arm 4 is preferably spherical at its upper part, to form the head 15, which is provided with an external shoulder, as 3, to bear against the end of the socket 2, and the head of the arm has a recess, as 7, in each side, which is open at the rear to receive the trunnion in the corresponding side of the socket, but is provided with a semicircular shoulder on the front side to bear against the trunnion, and the arm is provided with an eye, as 5, to receive and in which is secured the handle proper. After the head 15 is inserted into the socket with the trunnions in place in the recesses 7 it is then secured by a friction-lock, which consists of a metal piece secured to the rear side of the head of the arm, and projects out each side, in rear of the trunnions.

This friction-lock may consist of a plate or disk, as 8, secured to the rear side of the head by a screw, as 9, turned into the head, as shown clearly in Figs. I, III, and IV; or it may consist of a wire, suitably bent and cast into the metal arm when the latter is cast, as shown clearly in section in Fig. VII, the two ends of the wire projecting out straight from the arm, as shown in dotted lines in Figs. VI and VII. After the head is inserted in the socket in such case one of the ends of the wire is bent to one side and in rear of one of the trunnions, and the other end is bent to the other side, as shown clearly in Figs. V and VII. In either case the disk or the wire 8 is made to bear against the trunnions, so that as the arm is raised the trunnions are grasped by the circular shoulders on the front side of the recesses 7 and the disk or wire 8 behind with the desired degree of friction, and prevent the arm from rattling in its socket.

If the arms should become loose the friction may be increased by tightening the screw or bending in the ends of the wire against the trunnions.

In this manner all the metal portion of a casket-handle may be made and secured together very cheaply and quickly, and the arms made to move in their sockets with just the requisite amount of friction; and there are no rivet-heads or pivots to be exposed in the finished front of the metal when completed.

Having thus described my invention, what I claim as new is—

In a casket-handle, the combination of a socket adapted to be secured to a casket and having two inwardly-projecting side trunnions, an arm adapted to receive the handle and with two side recesses to receive the said trunnions, and an external shoulder to abut against said socket, and a projection secured to or made upon said arm and extending out each side in rear of said trunnions, substantially as and for the purpose described.

HUBERT W. MORGAN.

Witnesses:
ASA P. RAND,
JOHN O'BRIEN.